United States Patent

Simonyi et al.

[11] Patent Number: 4,894,780
[45] Date of Patent: Jan. 16, 1990

[54] PROCESS FOR SWITCHING THE GEAR-CHANGE OF AUTOMATIC TRANSMISSIONS OF MOTOR VEHICLES IN DEPENDENCE OF THE TEMPERATURE OF THE COOLING WATER

[75] Inventors: Sándor Simonyi, Salgótarján; György Ternóczky, Szigetszentmiklós; György Válóczi; István Tóth, both of Salgótarján, all of Hungary

[73] Assignee: Csepel Autogyár, Salgotarján, Hungary

[21] Appl. No.: 146,516

[22] Filed: Jan. 21, 1988

[51] Int. Cl.$^4$ .................... B60K 41/18; B60K 31/00
[52] U.S. Cl. ................... 364/424.1; 74/866; 74/844
[58] Field of Search ............ 369/424.1; 74/866, 867, 74/844

[56] References Cited

U.S. PATENT DOCUMENTS

| | | | |
|---|---|---|---|
| 3,732,754 | 5/1973 | Mori | 74/866 |
| 3,895,541 | 7/1975 | Nohira et al. | 74/866 |
| 4,449,618 | 5/1984 | Suga et al. | 74/866 X |
| 4,509,124 | 4/1985 | Suzuki et al. | 364/424.1 |
| 4,531,432 | 7/1985 | Inagaki et al. | 74/866 |

Primary Examiner—Felix D. Gruber
Attorney, Agent, or Firm—Schweitzer & Cornman

[57] ABSTRACT

A process and apparatus for modifying the operation of a motor vehicle automatic transmission as a function of the temperature of the vehicle engine. A control system is provided whereby, until the engine temperature reaches a predetermined minimum, all of the gear selection solenoids are disabled, so that no gear of the vehicle transmission can be engaged. Following warm-up to and above the minimum temperature, and while the engine is not yet warmed up to a desired higher (e.g., "normal") temperature, the selection solenoid for the III gear is disabled. A combination inputs from (a) the transmission control for selecting the III gear on the basis of driving conditions, and (b) the temperature control disabling the III gear on the basis of temperature conditions, simultaneously serves to enable the II gear. An override circuit allows the operator to engage the transmission in any gear, should other considerations supersede the desire to protect overload of the engine at low temperature.

5 Claims, 2 Drawing Sheets

PROCESS FOR SWITCHING THE GEAR-CHANGE OF AUTOMATIC TRANSMISSIONS OF MOTOR VEHICLES IN DEPENDENCE OF THE TEMPERATURE OF THE COOLING WATER

The invention relates to a process and apparatus by which starting and acceleration of a motor vehicle can be automatically restricted until the motor is heated up to the operative temperature.

Presently, with the majority of motor vehicles it lies within the scope of activities of the driver, whether he adheres to recommendations relating to the heating of the motor. Among the motor vehicles driven with a mechanical transmission those motor vehicles provided with pneumatic brake systems for storing brake spring force form the sole exception. As a part of said construction, one may namely determine the condition of the motor from the pressure of the supply air of the pneumatic brake system. Inadequate warm-up of the engine is signaled to the driver by blocking of the pneumatic brake system. After having warmed up the motor to the proper temperature, the pressure of the supply air rises, the pneumatic brakes can be released, and the driver is able to move the motor vehicle. This system protects against early switching to a higher gear involving a higher load for the motor. However, even in this case, protection of the motor is entrusted to the driver.

With motor vehicles provided with an automatic transmission said problems occur to an increased extent. Starting movement of the motor vehicle depends on the driver. However, switching to a higher speed is performed automatically. Considering that shifting times of the single gears are practically uncontrollable, or at least, this grade of circumspection cannot be expected from the driver, one has to endeavor to exclude premature starting and use of the gear shifting mechanism. The single satisfactory solution is to be found in the British Patent Specification No. GB-PS 2 126 291, however, in this case too the inventors could only restrict the starting process. With this solution from the multiple disc-clutch of the bottom gear the oil is returned to the oil pump via a by-pass branch which is actuated with a separate valve. The valve used to be regulated in dependence of the temperature of the cooling water. This system is utmost complicated in itself, however, to extend it for further gears would be even more complicated.

Accordingly, the aim of our invention is to prevent the excessive loading of a motor, which has not been warmed up properly, in an automatic way and independently of the actual behavior of the driver, in motor vehicles provided with an automatic transmission. The solution according to the invention is based on the recognition, that it is far easier to intervene in the control of the automatic transmission, than in the actuating system, particularly if the control unit is built up of electronic elements.

Accordingly, the invention relates to the automatic control of switching the bottom or reverse gears and the highest gear of an electronically controlled hydromechanically automatic transmission of a motor vehicle, as a function of the temperature of the cooling water. After having reached the temperature needed for starting motion of the motor vehicle, a signal is transmitted to the input of a control unit via a heat sensitive transmitter. On the basis of said signal, an enabling signal is transmitted to the electric armatures of an electrohydraulic valve system of the automatic transmission, for switching the I, II and reverse gears via the output of the control unit. Thereafter, after having reached the temperature of the cooling water needed for the higher gears, a further signal is transmitted to the input of the control unit. Based on said signal, a further enabling signal is transmitted to the armatures of the electrohydraulic valve system of the automatic transmission via the output of the control unit.

DESCRIPTION OF THE DRAWING

The invention will be described in detail by means of a preferred embodiment, with reference to the accompanying drawings, wherein.

DESCRIPTION OF A PREFERRED EMBODIMENT

Figure 1:
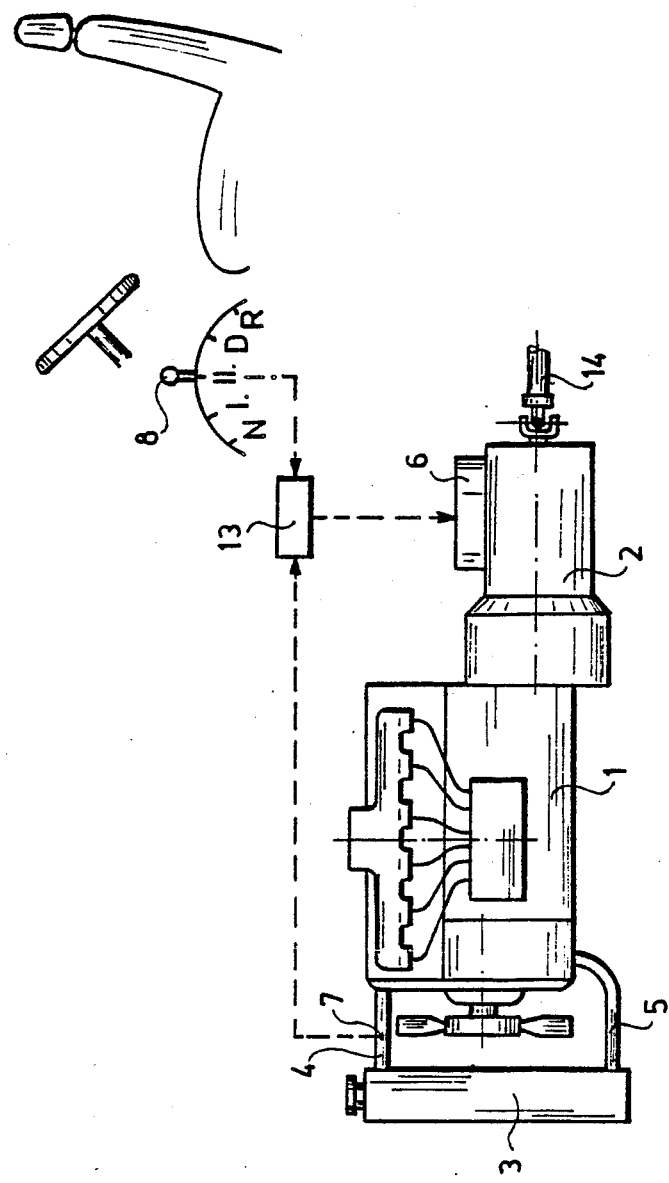
FIG. 1 illustrates the driving means of a motor vehicle

The process according to the invention has been realized on the drive of an autobus for the city traffic. As it is to be seen in FIG. 1, a six cylinder Diesel engine 1 is connected with a cooling radiator 3 via pipes 4, 5 delivering the cooling water, this representing the cooling water system of the motor 1.

The motor 1 transmits the drive through an electrohydraulically controlled hydromechanical automatic transmission 2 via a transmission shaft 14 to the wheels, not illustrated here. Gear change of the automatic transmission 2 is performed by an electrohydraulic valve system 6, which again is actuated by an electronic control unit 13. The control unit can be influenced by the driver, by means of the selector switch 8.

Figure 2:
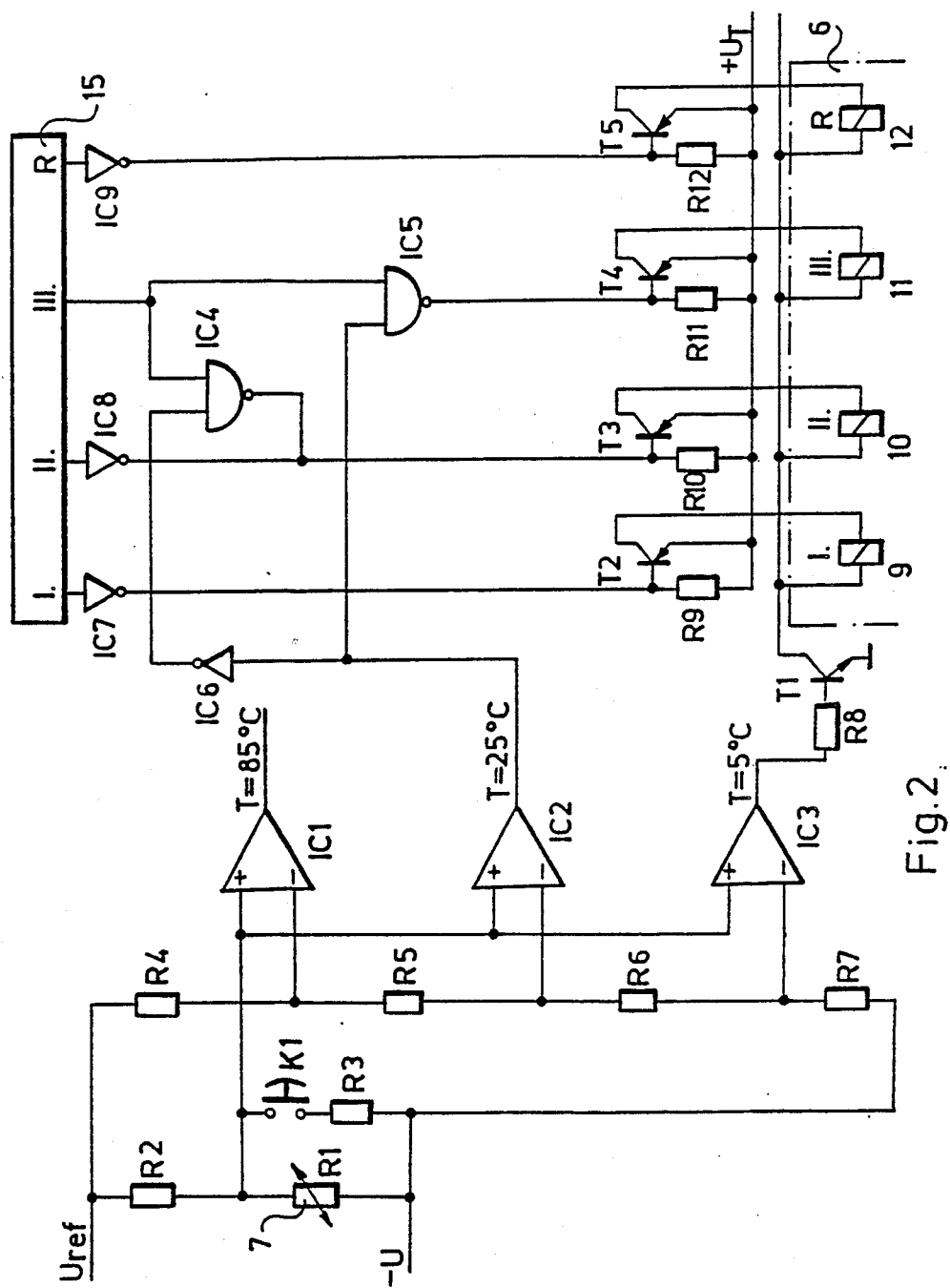
FIG. 2 is a schematic circuit arrangement of the electronics for realizing the process according to the invention.

The elements of the electronic apparatus, as shown in FIG. 2, are built in into the control unit 13. However, they also can be assembled as an independent unit.

For measuring the temperature of the cooling water a signal transmitter 7, indicating the temperature, is built into the cooling water pipe 4 of the motor 1, which is, as a matter of fact, the return pipe of the cooling water system of the motor 1. In our case, the temperature signal transmitter 7 is formed by a temperature measuring resistor $R_1$, which is connected (after the voltage divider $R_2$) with a group consisting of the resistors $R_4$, $R_5$, $R_6$, $R_7$ and the comparators IC1, IC2, IC3 ($\mu$ A 741).

Electromagnets 9, 10, 11 and 12 of the valves of the electrohydraulic valve system 6, for switching the I, II, III and R (reverse) gears, are connected to ground via the switching transistor T1, and via the power amplifiers T2, T3, T4, T5 to the supply voltage (+). The switching transistor T1 is connected with the output of the IC3 comparator via the resistor R8.

The gear selecting circuit 15 of the control unit 13 is connected, in a way not illustrated here, with the switch 8 selecting the driving mode and the signal transmitters needed for determining the proper gear. The signal output corresponding to the gear I of the gear selecting part 15 is connected through an inventor IC7 with a power amplifier T2 and through a resistor R9, connected in parallel therewith, with the supply voltage.

Similarly, the signal output of the gear selecting part 15 corresponding to the reverse gear R is connected via an invertor IC9 with a power amplifier T5 and through a resistor R12, connected parallel therewith, with the supply voltage.

The signal output of the gear selecting part 15 corresponding to the II gear is connected to a power amplifier T3 via an invertor IC8 and to the supply voltage via a resistor R10. At the same time, parallel with the inventor IC8, the power amplifier T3 is connected to the output of a NAND gate of the IC4 stage. One of the inputs of the NAND gate of the stage IC4 is connected via an invertor IC6 to the output of the comparator IC2, while the other IC4 input is connected to the signal output of the gear selecting part 15 corresponding to the high speed (III gear). The signal output of the gear selecting unit corresponding to the III gear is connected via one input and the output of a NAND gate of the stage IC5 to a power amplifier T4, and through a resistor R11 connected parallel therewith, to the supply voltage. The other input of the NAND gate IC5 is connected also to the output of the comparator IC2.

The poles of the temperature-measuring resistor R1 can be short circuited through the hand switch K1 and the resistor R3.

The system for realizing the process according to the invention operates as follows:

After having started the motor 1, the temperature signal transmitter 7 indicates continuously to the control unit 13 the changes in the temperature of the cooling water. The signal transmitted is evaluated in the comparators IC2, IC3 such that, if the temperature of the cooling water reaches 5° C, a signal appears at the output of the comparator IC3. If the temperature rises to 25° C, a signal appears on the output of the comparator IC2.

The values of temperature are chosen so as to be in compliance with recommended loadability of the engine. The values 5° C, resp. 25° C represent empirical values having been gained with a given motor, however, they can be reasonably used with other motors.

Now, if the driver intends to move the vehicle he connects the drive using the switch 8 selecting the mode of run. If thereafter the motor vehicle is accelerated by pressing the gas pedal, the control unit 13 would give the command to the electrohydraulic valve system 6 to accelerate the automatic transmission 2 continuously through the I and II gears and up to the high speed (III), depending on the acceleration of the motor vehicle.

However, as long as the temperatures of the cooling water is below 5° C, no signal appears on the output of the comparator IC3. Accordingly, the switching transistor T1 does not connect the solenoids 9, 10, 11, 12 to ground. In such a manner the signal for switching the low speed arrives without avail to the gear selecting part 15, as the electromagnet 9 is unable to fulfill the command.

As soon as the temperature of the cooling water reaches 5° C the comparator IC3 gives a signal and the switching transistor T1, by using said signal, connects all of the electromagnets 9, 10, 11, 12 to ground. Now, upon the signal of the gear selecting part 15, corresponding to the low speed I, the power amplifier T2 switches the electromagnet 9 to the supply voltage. Thereafter, after having reached the necessary acceleration, upon the signal corresponding to the second (intermediate) speed II, the power amplifier T3 switches the electromagnet 10 to the supply voltage. In such a manner the electrohydraulic valve system switches the automatic transmission 2 into the first and second speeds.

Now, if the motor vehicle is further accelerated, the speed needed for the III gear (high speed) will be reached. In this case the gear selecting part 15 transmits the signal on the proper output III. This signal, however will induce a signal on the output of the NAND gate IC5 only if a further requirement is also met: namely, the signal of the output of the comparator IC2 must also appear on the input of the NAND gate IC5. If the requirement is met, upon the signal of the output of the NAND gate IC5 the power amplifier T4 switches the electromagnet 11 to the supply voltage. In such a manner the electrohydraulic valve system 6 switches the automatic transmission into the high speed.

If the temperature of the coolant has not yet reached 25° C, and therefore the comparator IC2 does not yet provide an output signal, but the velocity of the vehicle has already reached the value necessary for the III gear, the selector part 15 nevertheless proceeds to discontinue the output signal for switching in the II gear and it emits the output signal for switching in the III gear. Since there is now no output signal corresponding to the II gear, and the III gear cannot be activated, the automatic transmission 2 would otherwise switch into idle. In order to prevent this happening, the output signal of the IC2 comparator corresponding to coolant temperature of below 25° C (low) reaches one input of the IC4 NAND gate through an invertor IC6. The output signal relating to the III gear of the selector part 15 is connected to the other input of the NAND gate IC4, and the signal which appears at its output thus replaces the discontinued output signal of the selector part 15 corresponding to switching the II gear.

When the temperature of the coolant finally reaches 25° C, the signal at the output of the IC2 comparator, will change. Because of the invertor IC6, the signal at the output of the NAND gate IC4 will cease and simultaneously a signal appears on the output of the NAND gate IC5. Switching from the II gear to the III gear thereupon takes place in the manner indicated above.

If the driver intends to switch to the reverse gear, he gives a command to the control unit 13 by using the selector switch 8. The signal of the gear selecting part 15 corresponding to the reverse gear switches the electromagnet 12 of the electrohydraulic valve system, 6 through the invertor IC9 and power amplifier T5, to the supply voltage. If the temperature of the cooling water exceeds 5° C, the switching transistor T1 connects the electromagnet 12 also to ground after having received the signal of the comparator IC3.

It becomes obvious from the foregoing that by using the process according to the invention any optional gear switch can be stopped if the temperature of the cooling water is too low (e.g., below 5° C).

As danger situations may occur, in which quick movement of the vehicle is to be preferred to the careful treating of the motor, the system can be rendered independent of the temperature of the cooling water by means of the manual switch K1.

As already mentioned before, the system, includes an additional comparator IC1 ($\mu$ A 741) not involved with the essence of the invention. However, the additional comparator offers the possibility of the detection of overheating of the cooling water. Accordingly, at a temperature of 85° C, for example the comparator IC1 provides an output signal, by which an alarm apparatus (signal lamp or any device giving an acoustic signal) can be actuated.

What we claim:

1. A process for controlling a motor vehicle automatic transmission of the type having a manual selector control for the selection of at least I, II, III and R gears, individual control solenoids associated with each of said gears for effecting gear changes, a control system, including individual energizing circuits for said solenoids, for actuating said solenoids in a sequence in accordance with the position of said manual selector and the driving conditions experienced by said vehicle, and an engine temperature sensing means, which comprises (a) in response to the sensing of engine temperatures lower than a predetermined minimum temperature, causing all of the solenoids to be disabled, (b) in response to the sensing of engine temperatures above said minimum but below a predetermined normal temperature, causing the III gear solenoid to be disabled, and (c) when said III gear solenoid is disabled as set forth in (b), causing the II gear solenoid to be enabled as a function of (i) the manual selector switch being set in the III position and (ii) the control system calling for shifting of the transmission into the II gear as a function of driving conditions.

2. In an apparatus for controlling a motor vehicle automatic transmission system for preventing premature transmission engagement and premature loading, and wherein the system is of the type having a manual selector control for the selection of at least I, II, III and R gears, individual control solenoids associated with each of said gears for effecting gear changes, a control system, including individual energizing circuits for said solenoids, for actuating said solenoids in a sequence in accordance with the position of said manual selector and the driving conditions experienced by said vehicle, and an engine temperature-responsive control associated with said control system for modifying the control of said solenoids as a function of engine temperature, the improvement which comprises, (a) first circuit means responsive to sensing of engine temperature lower than a predetermined minimum to disable the energizing circuits for all of said solenoids and thereby prevent said vehicle transmission from being engaged in any of said gears, (b) second circuit means responsive to the sensing of engine temperature higher than said predetermined minimum but lower than a predetermined normal level of engine temperature, to selectively disable the energizing circuit for one or more of the forward gears higher than the I gear, (c) third circuit means responsive to the sensing of engine temperature at or above a predetermined normal temperature to enable the energizing circuits of all of said solenoids, and (d) override circuit means for enabling the energizing circuits for all of said solenoids independently of engine temperature.

3. Apparatus according to claim 2, further characterized by (a) each of said solenoids having one side connected via said first circuit means to one side of the power supply, whereby interruption of said first circuit means is effective to disable simultaneously all of said solenoids, and (b) at least the solenoid for the III gear being connected on its other side to the power supply via said second circuit means, whereby the solenoid for said III gear may be disabled.

4. Apparatus according to claim 3, and wherein said control system includes means effective, when said manual selectors is set for the III gear further, to successively activate the energizing circuits for solenoids for the I, II and III gears in succession as the vehicle accelerates, characterized by (a) said second circuit means including circuit elements in the energizing circuits for said II and III gears, whereby when the solenoid for the III gear is disabled by said second circuit means as a function of engine temperature above said predetermined minimum temperature but below said predetermined normal temperature, the energizing circuit of the solenoid for the II gear is simultaneously enabled.

5. Apparatus according to claim 4, further characterized by (a) the energizing circuits for each of the solenoids for said II and III gears including a separate NAND gate, (b) one input of each of said NAND gates comprising the activating circuit of the solenoid for said III gear, (c) a voltage output means responsive to engine temperature below said predetermined normal to output no signal and responsive to engine temperature at or above normal to output a signal, (d) an inverter connected to said voltage output means and having its output connected to the other input of the NAND gate for the II gear solenoid, (e) the other input of the NAND gate for the III gear solenoid being connected to said voltage output means, (f) the outputs of said NAND gates being connected to the energizing circuits of the II and III gear solenoids whereby, when the III gear is activated by said control system, one or the other of the II or III gear solenoids is energized, if engine temperature is above minimum, depending upon engine temperature being below or above said predetermined normal temperature.

* * * * *